(12) United States Patent
Zhang et al.

(10) Patent No.: US 10,040,058 B2
(45) Date of Patent: Aug. 7, 2018

(54) MIDDLE DISTILLATE HYDROCRACKING CATALYST CONTAINING ZEOLITE USY, AND ZEOLITE BETA WITH LOW ACIDITY AND LARGE DOMAIN SIZE

(71) Applicants: Yihua Zhang, Albany, CA (US); Theodorus Ludovicus Michael Maesen, Moraga, CA (US); Yalin Hao, Danville, CA (US); Thomas Michael Rea, Vacaville, CA (US)

(72) Inventors: Yihua Zhang, Albany, CA (US); Theodorus Ludovicus Michael Maesen, Moraga, CA (US); Yalin Hao, Danville, CA (US); Thomas Michael Rea, Vacaville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 329 days.

(21) Appl. No.: 14/823,807

(22) Filed: Aug. 11, 2015

(65) Prior Publication Data

US 2017/0043329 A1 Feb. 16, 2017

(51) Int. Cl.
*B01J 29/80* (2006.01)
*B01J 37/04* (2006.01)
(Continued)

(52) U.S. Cl.
CPC .............. *B01J 29/80* (2013.01); *B01J 23/88* (2013.01); *B01J 23/888* (2013.01); *B01J 29/084* (2013.01);
(Continued)

(58) Field of Classification Search
CPC ........ B01J 29/80; B01J 37/0236; B01J 37/08; B01J 29/7007; B01J 35/002;
(Continued)

(56) References Cited

U.S. PATENT DOCUMENTS 4,740,292 A 4/1988 Chen et al.
5,160,033 A 11/1992 Vassilakis et al.
(Continued)

FOREIGN PATENT DOCUMENTS

WO 2007056045 A1 5/2007
WO 2008011289 A2 1/2008
(Continued)

*Primary Examiner* — Randy Boyer
*Assistant Examiner* — Juan C Valencia
(74) *Attorney, Agent, or Firm* — Mark L. Warzel (57) ABSTRACT

A hydrocracking catalyst is provided comprising: a zeolite beta having an OD acidity of 20 to 50 µmol/g and an average crystal size from 300 to 800 nanometers; a zeolite USY; wherein a wt % of the zeolite beta is less than the wt % of the zeolite USY; a support comprising an amorphous silica aluminate and a second support material; and at least one metal selected from the group consisting of elements from Group 6 and Groups 8 through 10 of the Periodic Table. A process for hydrocracking a hydrocarbonaceous feedstock is provided, comprising: contacting the hydrocarbonaceous feedstock with the hydrocracking catalyst under hydrocracking conditions to produce a hydrocracked effluent that comprises middle distillates. A method for making the hydrocracking catalyst is also provided.

23 Claims, 3 Drawing Sheets

(51) Int. Cl.
*B01J 35/00* (2006.01)
*B01J 23/88* (2006.01)
*B01J 23/888* (2006.01)
*B01J 29/08* (2006.01)
*B01J 29/70* (2006.01)
*B01J 37/00* (2006.01)
*B01J 37/02* (2006.01)
*B01J 37/08* (2006.01)
*C10G 47/20* (2006.01)
*B01J 29/16* (2006.01)
*B01J 29/78* (2006.01)

(52) U.S. Cl.
CPC ......... *B01J 29/7007* (2013.01); *B01J 35/002* (2013.01); *B01J 35/0006* (2013.01); *B01J 37/0018* (2013.01); *B01J 37/0201* (2013.01); *B01J 37/0207* (2013.01); *B01J 37/0236* (2013.01); *B01J 37/04* (2013.01); *B01J 37/08* (2013.01); *C10G 47/20* (2013.01); *B01J 29/166* (2013.01); *B01J 29/7815* (2013.01)

(58) Field of Classification Search
CPC .... B01J 37/0201; B01J 37/0018; B01J 37/04; B01J 35/0006; B01J 37/0207; B01J 29/084; B01J 23/888; B01J 23/88; B01J 29/7815; B01J 29/166; C10G 47/20
See application file for complete search history.

(56) References Cited

U.S. PATENT DOCUMENTS

| | | |
|---|---|---|
| 5,228,979 A | 7/1993 | Ward |
| 5,275,720 A | 1/1994 | Ward |
| 5,279,726 A | 1/1994 | Ward et al. |
| 5,350,501 A | 9/1994 | Ward et al. |
| 5,447,623 A | 9/1995 | Ward et al. |
| 5,853,566 A | 12/1998 | Kraushaar-Czarnetzki et al. |
| 5,954,944 A | 9/1999 | Zhang et al. |
| 7,048,845 B2 | 5/2006 | Bauer |
| 7,169,291 B1 | 1/2007 | Wang |
| 7,323,100 B2 | 1/2008 | Espinoza et al. |
| 2001/0001449 A1 | 5/2001 | Kiliany et al. |
| 2006/0052233 A1* | 3/2006 | Beeckman ............. B01J 20/183 502/60 |
| 2007/0102322 A1 | 5/2007 | Wang |
| 2012/0055846 A1* | 3/2012 | Domokos .............. B01J 29/084 208/111.35 |
| 2013/0210611 A1* | 8/2013 | Kim .................... B01J 29/7215 502/66 |

FOREIGN PATENT DOCUMENTS

| | | |
|---|---|---|
| WO | 2008011291 A2 | 1/2008 |
| WO | 2008016888 A2 | 2/2008 |

\* cited by examiner

MIDDLE DISTILLATE HYDROCRACKING CATALYST CONTAINING ZEOLITE USY, AND ZEOLITE BETA WITH LOW ACIDITY AND LARGE DOMAIN SIZE

This application is related to two co-filed applications titled "MIDDLE DISTILLATE HYDROCRACKING CATALYST CONTAINING ZEOLITE BETA WITH LOW OD ACIDITY AND LARGE DOMAIN SIZE" and "IMPROVED NOBLE METAL ZEOLITE CATALYST FOR SECOND STAGE HYDROCRACKING TO MAKE MIDDLE DISTILLATE", herein incorporated in their entireties.

TECHNICAL FIELD

This application is directed to a hydrocracking catalyst composition, a process for hydrocracking using the hydrocracking catalyst composition, and a method to make the hydrocracking catalyst composition.

BACKGROUND

Improved hydrocracking catalysts and processes for using them and making them are needed. Earlier hydrocracking catalysts have not provided the desired levels of activity and selectivity that are required to optimize the production of middle distillates.

SUMMARY

This application provides a hydrocracking catalyst comprising:
  a. a zeolite beta having an OD acidity of 20 to 50 µmol/g and an average domain size from 800 to 1500 nm$^2$;
  b. a zeolite USY; wherein a wt % of the zeolite beta is less than the wt % of the zeolite USY;
  c. a support comprising an amorphous silica aluminate and a second support material; and
  d. at least one metal selected from the group consisting of elements from Group 6 and Groups 8 through 10 of the Periodic Table.

This application also provides a process for hydrocracking a hydrocarbonaceous feedstock, comprising: contacting the hydrocarbonaceous feedstock with a hydrocracking catalyst under hydrocracking conditions to produce a hydrocracked effluent that comprises middle distillates; wherein the hydrocracking catalyst comprises:
  a. a zeolite beta having an OD acidity of 20 to 50 µmol/g and an average domain size from 800 to 1500 nm$^2$;
  b. a zeolite USY; wherein a wt % of the zeolite beta is less than the wt % of the zeolite USY;
  c. a support comprising an amorphous silica aluminate and a second support material; and
  d. at least one metal selected from the group consisting of elements from Group 6 and Groups 8 through 10 of the Periodic Table.

This application also provides a method for making a hydrocracking catalyst, comprising:
  a. mixing together a zeolite beta having an OD acidity of 20 to 50 µmol/g and an average domain size from 800 to 1500 nm$^2$; a zeolite USY in an amount greater than the zeolite beta; an amorphous silica aluminate; a second support material; and enough liquid to form an extrudable paste;
  b. extruding the extrudable paste to form an extrudate base;
  c. impregnating the extrudate base with a metal impregnation solution containing at least one metal selected from the group consisting of elements from Group 6 and Group 8 through 10 of the Periodic Table to make a metal-loaded extrudate; and
  d. post-treating the metal-loaded extrudate by subjecting the metal-loaded extrudate to drying and calcination; wherein the hydrocracking catalyst has improved selectivity for producing a hydrocracked effluent having a true boiling point (TBP) of 380-700° F. (193-371° C.).

The present invention may suitably comprise, consist of, or consist essentially of, the elements in the claims, as described herein.

GLOSSARY

Figure 1:
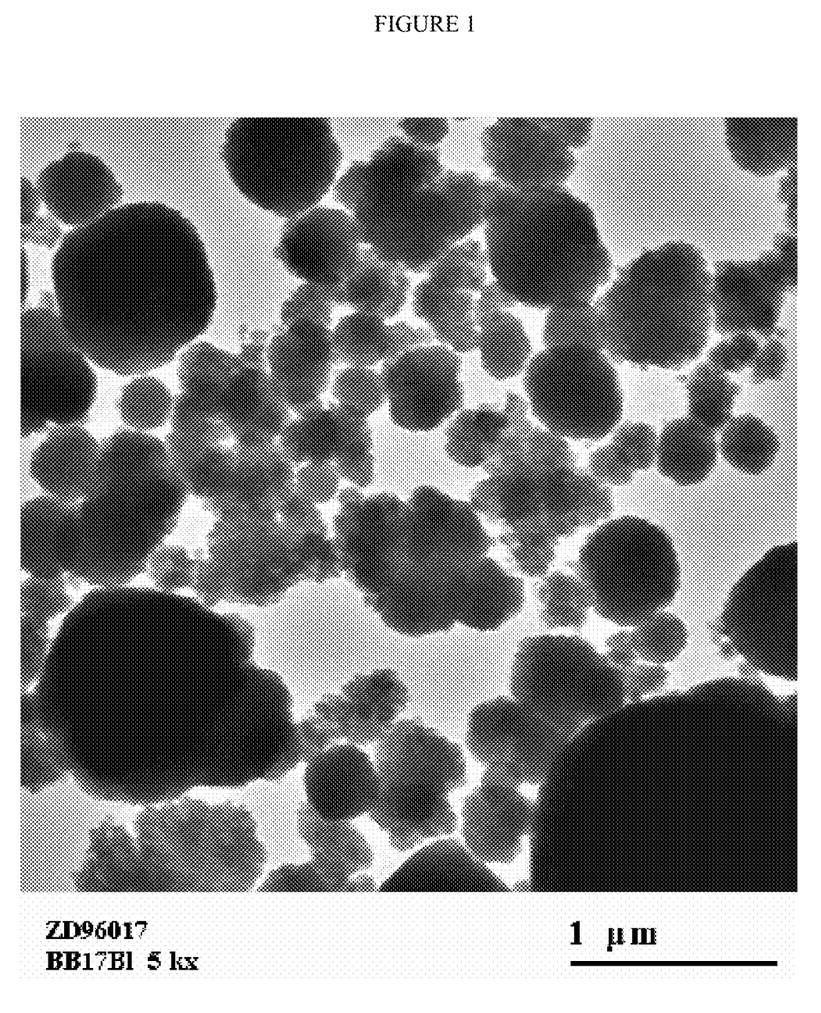
FIG. 1 is a transmission electron microscopy (TEM) image showing the agglomerate crystals of the H-BEA-150 zeolite beta used in the preparation of the hydrocracking catalysts in the examples.
Figure 2:
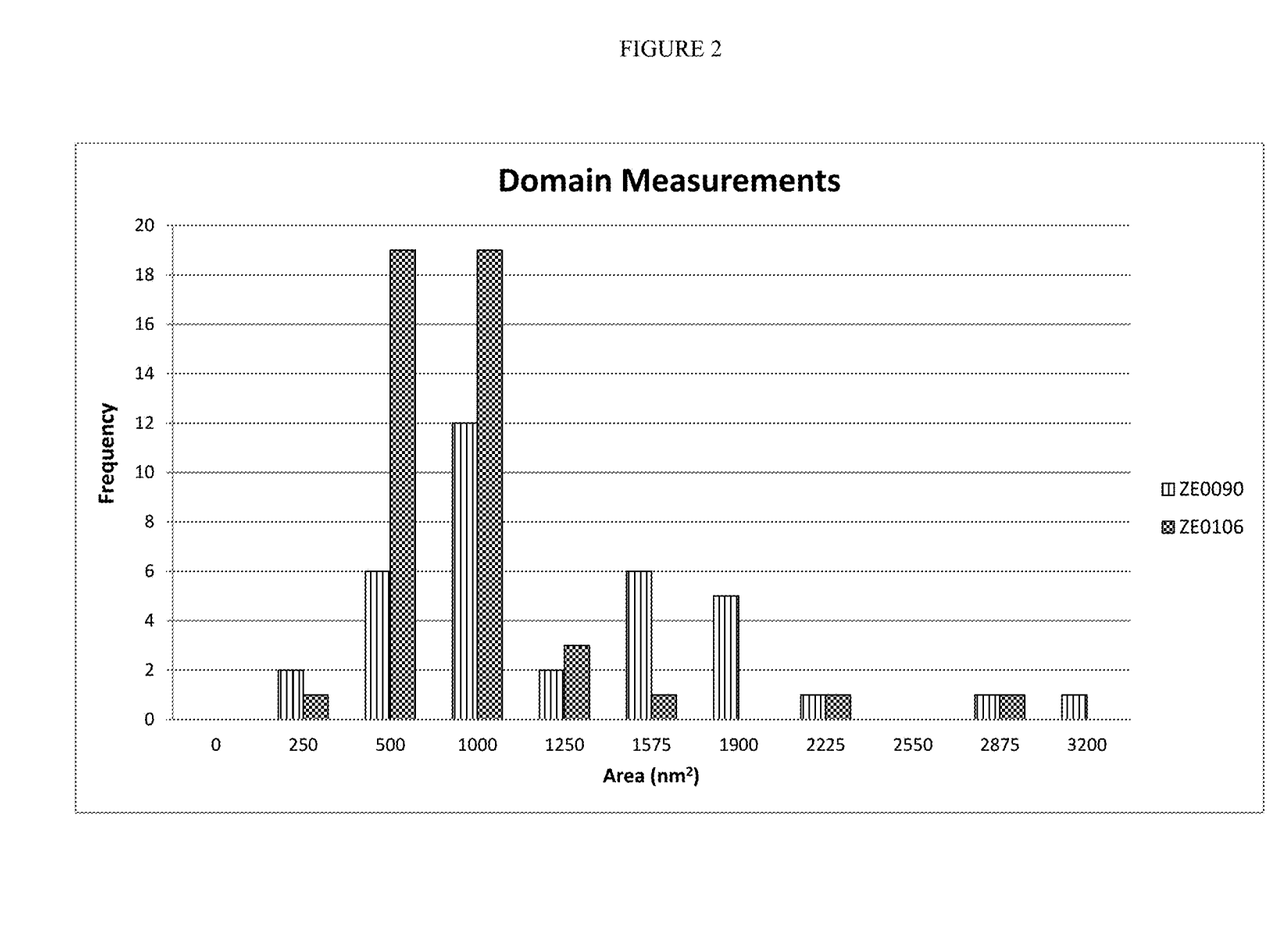
FIG. 2 is a chart of the domain measurements made on two samples of zeolite beta.
Figure 3:
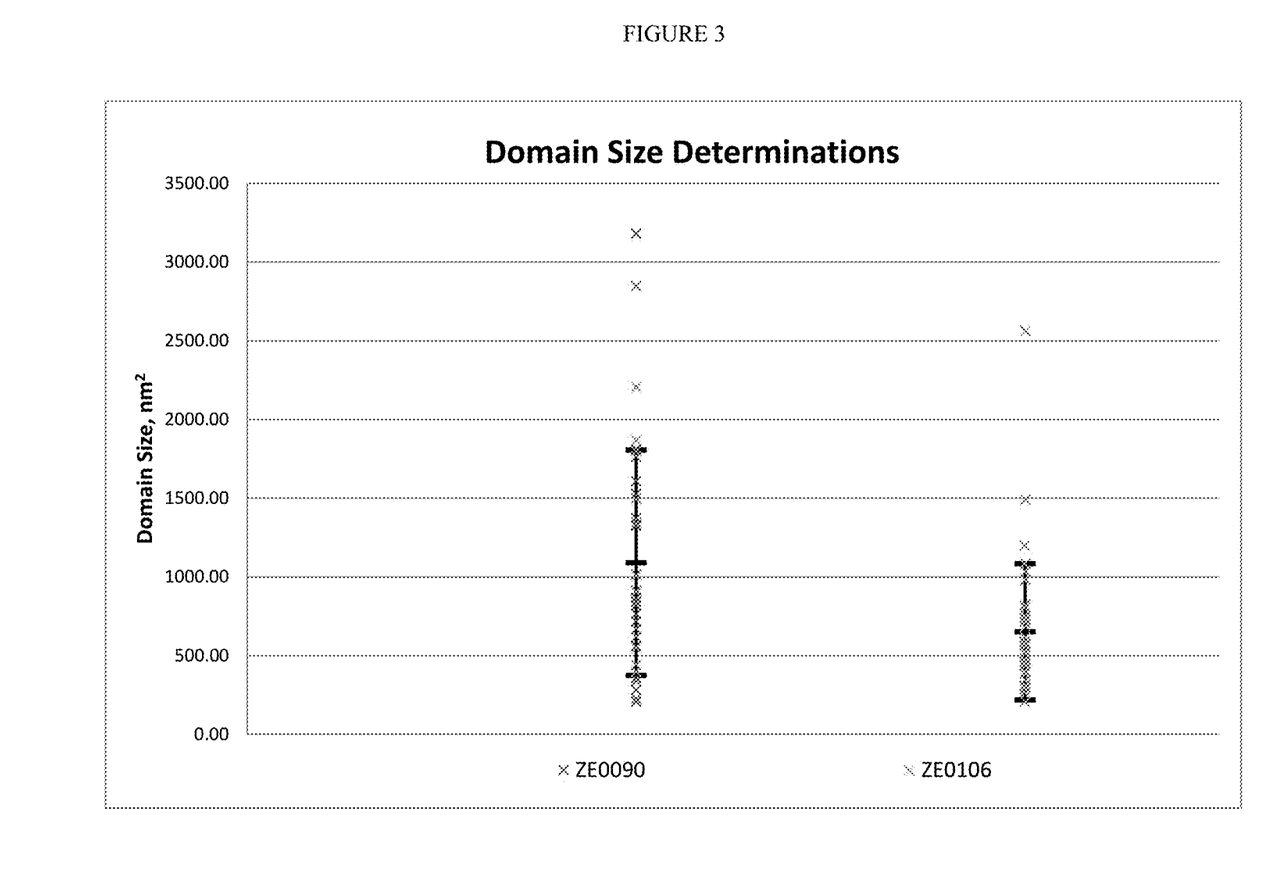
FIG. 3 is a chart of the average domain sizes of two samples of zeolite beta.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins(naphthenes) into non-cyclic branched paraffins.

"Cut point" refers to the temperature on a True Boiling Point ("TBP") curve at which a predetermined degree of separation is reached.

"TBP" refers to the true boiling point of a hydrocarbonaceous feed or product, as determined by ASTM D2887-13.

"Hydrocarbonaceous" means a compound or substance that contains hydrogen and carbon atoms, and which can include heteroatoms such as oxygen, sulfur, or nitrogen.

"Distillates" include the following products:

| Products | Typical Cut Points, ° F. (° C.) for North American Market |
|---|---|
| Light Naphtha | $C_5$-180 ($C_5$-82) |
| Heavy Naphtha | 180-300 (82-149) |
| Jet | 300-380 (149-193) |
| Kerosene | 380-530 (193-277) |
| Diesel | 530-700 (277-371) |

"Middle distillates" elude jet, kerosene and diesel products, as defined by their typical cut points, above.

"Heavy middle distillates" refers to products having a TBP of 380-700° F. (193-371° C.).

"Finished catalyst" refers to the hydrocracking catalyst composition comprising all of its components and after all of the processing and any post-processing steps used to manufacture it.

"LHSV" means liquid hourly space velocity.

"SCF/B" refers to a unit of standard cubic foot of gas (e.g., nitrogen, hydrogen, air, etc) per barrel of hydrocarbonaceous feed.

"Zeolite beta" refers to zeolites having a 3-dimensional crystal structure with straight 12-membered ring channels with crossed 12-membered ring channels, and having a framework density of about 15.3 T/1000 Å $^3$. Zeolite beta has a BEA framework as described in Ch. Baerlocher and L. B. McCusker, Database of Zeolite Structures: http://www.iza-structure.org/databases/

"SiO$_2$/Al$_2$O$_3$ ratio (SAR) is determined by inductively coupled plasma (ICP) elemental analysis. A SAR of infinity means there is no aluminum in the zeolite, i.e., the mole ratio of silica to alumina is infinity. In that case, the zeolite is comprised of essentially all silica.

"Zeolite USY" refers to ultra-stabilized Y zeolite. Y zeolites are synthetic faujasite (FAU) zeolites having a SAR of 3 or higher. Y zeolite can be ultra-stabilized by one or more of hydrothermal stabilization, dealumination, and isomorphous substitution. Zeolite USY can be any FAU-type zeolite with a higher framework silicon content than a starting (as-synthesized) Na—Y zeolite precursor.

"Catalyst support" refers to a material, usually a solid with a high surface area, to which a catalyst is affixed.

"Periodic Table" refers to the version of the IUPAC Periodic Table of the Elements dated Jun. 22, 2007, and the numbering scheme for the Periodic Table Groups is as described in Chemical And Engineering News, 63(5), 27 (1985).

"OD acidity" refers to the amount of bridged hydroxyl groups exchanged with deuterated benzene at 80° C. by Fourier transform infrared spectroscopy (FTIR). OD acidity is a measure of the Brönsted acid sites density in a catalyst. The extinction coefficient of OD signals was determined by analysis on a standard zeolite beta sample calibrated with $^1$H magic-angle spinning nuclear magnetic resonance (MAS NMR) spectroscopy. A correlation between the OD and OH extinction coefficients was obtained as following:

$$\varepsilon_{(-OD)} = 0.62 * \varepsilon_{(-OH)}.$$

"Domain Size" is the calculated area, in nm$^2$, of the structural units observed and measured in zeolite beta catalysts. Domains are described by Paul A. Wright et. al., "Direct Observation of Growth Defects in Zeolite Beta", JACS Communications, published on web Dec. 22, 2004. The method used to measure the domain sizes of zeolite beta is further described herein.

"Acid site distribution index (ASDI)" is an indicator of the hyperactive site concentration of a zeolite. In some embodiments, the lower the ASDI the more likely the zeolite will have a greater selectivity towards the production of heavier middle distillate products.

"Amorphous silica aluminate (ASA)" refers to a synthetic material having some of the alumina present in tetrahedral coordination as shown by nuclear magnetic resonance imaging. ASA can be used as a catalyst or catalyst support. Amorphous silica alumina contains sites which are termed Brønsted acid (or protic) sites, with an ionizable hydrogen atom, and Lewis acid (aprotic), electron accepting sites and these different types of acidic site can be distinguished by the ways in which, say, pyridine attaches.

"Pseudo-boehmite alumina refers to an aluminum compound with the chemical composition ALO(OH). Pseudo-boehmite alumina consists of finely crystalline boehmite with a higher water content than boehmite.

"Polycyclic index" (PCI) refers to a calculated value that relates to the amount of polycyclic aromatics that are in a hydrocarbon feed. The test method to determine PCI is ASTM D6379-11.

"API gravity" refers to the gravity of a petroleum feedstock or product relative to water, as determined by ASTM D4052-11.

DETAILED DESCRIPTION

Without being bound by theory, it is believed that the unique combination of zeolite beta with a defined OD acidity and a defined average domain size, optionally combined with a zeolite USY with a defined acid site distribution index (ASDI); combined in a specified proportion provides a hydrocracking catalyst having much improved hydrocracking performance. The unique combination of these two zeolites in a hydrocracking catalyst gives improved selectivity for producing a hydrocracked effluent having a TBP of 380-700° F. (193-371° C.). The hydrocracking catalyst can also provide improved activity, such as from 1 to 20° F. at 60% conversion compared to other hydrocracking catalysts that do not have the unique combination of zeolites disclosed herein.

Hydrocracking Catalyst Composition—Zeolite Beta:

The zeolite beta has an OD acidity of 20 to 50 μmol/g and an average domain size from 800 to 1500 nm$^2$. In one embodiment, the OD acidity is from 30 to 40 μmol/g.

In one embodiment the zeolite beta is synthetically manufactured using organic templates. Examples of three different zeolite betas are described in Table 1.

TABLE 1

| Zeolite Betas | SiO$_2$/Al$_2$O$_3$ Molar Ratio (SAR) | OD Acidity, μmol/g |
|---|---|---|
| H-BEA-35 | 35 | 304 |
| H-BEA-150 (ZE0090) | 150 | 36 |
| CP811C-300 (ZE0106) | 300 | Not measured |

The total OD acidity was determined by H/D exchange of acidic hydroxyl groups by FTIR spectroscopy. The method to determine the total OD acidity was adapted from the method described in the publication by Emiel J. M. Hensen et. al., J. Phys. Chem., C2010, 114, 8363-8374. Prior to FTIR measurement, the sample was heated for one hour at 400-450° C. under vacuum<1×10$^{-5}$ Torr. Then the sample was dosed with C$_6$D$_6$ to equilibrium at 80° C. Before and after C$_6$D$_6$ dosing, spectra were collected for OH and OD stretching regions.

The average domain size was determined by a combination of transmission electron microscopy (TEM) and digital image analysis, as follows:

I. Zeolite Beta Sample Preparation:

The zeolite beta sample was prepared by embedding a small amount of the zeolite beta in an epoxy and microtoming. The description of suitable procedures can be found in many standard microscopy text books.

Step 1. A small representative portion of the zeolite beta powder was embedded in epoxy. The epoxy was allowed to cure.

Step 2. The epoxy containing a representative portion of the zeolite beta powder was microtomed to 80-90 nm thick. The microtome sections were collected on a 400 mesh 3 mm copper grid, available from microscopy supply vendors.

Step 3. A sufficient layer of electrically-conducting carbon was vacuum evaporated onto the microtomed sections to prevent the zeolite beta sample from charging under the electron beam in the TEM.

II. TEM Imaging:

Step 1. The prepared zeolite beta sample, described above, was surveyed at low magnifications, e.g., 250,000-1,000,000× to select a crystal in which the zeolite beta channels can be viewed.

Step 2. The selected zeolite beta crystals were tilted onto their zone axis, focused to near Scherzer defocus, and an image was recorded ≥2,000,000×.

III. Image Analysis to Obtain Average Domain Size ($nm^2$):

Step 1. The recorded TEM digital images described previously were analyzed using commercially available image analysis software packages.

Step 2. The individual domains were isolated and the domain sizes were measured in $nm^2$. The domains where the projection was not clearly down the channel view were not included in the measurements.

Step 3. A statistically relevant number of domains were measured. The raw data was stored in a computer spreadsheet program.

Step 4. Descriptive statistics, and frequencies were determined—The arithmetic mean ($d_{av}$), or average domain size, and the standard deviation (s) were calculated using the following equations:

The average domain size, $d_{av} = (å n_i d_i)/(å n_i)$

The standard deviation, $s = (å(d_i - d_{av})^2/(å n_i))^{1/2}$

In one embodiment the average domain size is from 900 to 1250 $nm^2$, such as from 1000 to 1150 $nm^2$.

Hydrocracking Catalyst Composition—Zeolite USY:

The hydrocracking catalyst comprises a zeolite USY in an amount that provides a wt % of the zeolite beta less than the wt % of the zeolite USY.

In one embodiment, the zeolite USY has an acid site distribution index (ASDI) that favors the production of heavy middle distillates. For example the zeolite USY can have an ASDI from 0.05 to 0.12. ASDI is determined by H/D exchange of acidic hydroxyl groups by FTIR spectroscopy, as described previously. Brönsted acid sites density was determined by using the integrated area of peak 2676 $cm^{-1}$ as the first high frequency OD (HF), 2653 $cm^{-1}$ as the $2^{nd}$ high frequency OD (HF'), 2632 $cm^{-1}$ and 2620 $cm^{-1}$ as the first low frequency OD (LF) and 2600 $cm^{-1}$ as the $2^{nd}$ low frequency OD (LF'). The acid site distribution index factor was determined by the following equation: ASDI=(HF'+LF')/(HF+LF); which reflects the hyperactive acid sites content in the zeolite sample. In one embodiment the zeolite USY has a total Brönsted acid sites determined by FTIR after H/D exchange of 0.080 to 0.200 mmol/g.

In one embodiment, the hydrocracking catalyst has a weight ratio of the zeolite beta to the zeolite USY is from 0.10 to 0.95.

In one embodiment, the amorphous silica aluminate (ASA) has greater thermal stability than high purity aluminas Examples of suitable amorphous silica aluminates are SIRAL® ASAs, described below:

Examples of the second support material can include kieselguhr, alumina, silica, and silica-alumina. Other examples of the second support material include alumina-boria, silica-alumina-magnesia, silica-alumina-titania and materials obtained by adding zeolites and other complex oxides thereto. In one embodiment, the second support material is porous, and comprises a natural clay or a synthetic oxide. The second support material can be selected to provide adequate mechanical strength and chemical stability at the reaction conditions under which the hydrocracking catalyst is employed.

In one embodiment, the second support material comprises a pseudo-boehmite alumina Examples of pseudo-boehmite alumina are CATAPAL® high purity aluminas CATAPAL® is a registered trademark of SASOL. Typical properties of the CATAPAL high purity aluminas are summarized below:

TABLE 3

| Typical Properties | CATAPAL B | CATAPAL C1 | CATAPAL D | CATAPAL 200 |
|---|---|---|---|---|
| $Al_2O_3$, wt % | 72 | 72 | 76 | 80 |
| $Na_2O$, wt % | 0.002 | 0.002 | 0.002 | 0.002 |
| Loose Bulk Density, g/l | 670-750 | 670-750 | 700-800 | 500-700 |
| Packed Bulk Density, g/l | 800-1100 | 800-1100 | 800-1100 | 700-800 |
| Average Particle size ($d_{50}$), μm | 60 | 60 | 40 | 40 |
| Surface Area* (BET), $m^2/g$ | 250 | 230 | 220 | 100 |
| Pore Volume*, ml/g | 0.50 | 0.50 | 0.55 | 0.70 |
| Crystal size, nm | 4.5 | 5.5 | 7.0 | 40 |

*Surface area and pore volume were determined after activation at 550° C. for 3 hours.

The metal used in the hydrocracking catalyst is selected from the group consisting of elements from Group 6 and Groups 8 through 10 of the Periodic Table, and mixtures thereof. In one embodiment, each metal is selected from the group consisting of nickel (Ni), palladium (Pd), platinum (Pt), cobalt (Co), iron (Fe), chromium (Cr), molybdenum (Mo), tungsten (W), and mixtures thereof. Examples of mixtures of metals that can be used include Ni/Mo/W, Ni/Mo, Ni/W, Co/Mo, Co/W, Co/W/Mo, Ni/Co/W/Mo, and Pt/Pd. In another embodiment, the hydrocracking catalyst contains at least one Group 6 metal and at least one metal selected from Groups 8 through 10 of the periodic table. Exemplary metal combinations include Ni/Mo/W, Ni/Mo, Ni/W, Co/Mo, Co/W, Co/W/Mo and Ni/Co/W/Mo.

TABLE 2

| Typical Properties | | SIRAL 1 | SIRAL 5 | SIRAL 10 | SIRAL 20 | SIRAL 30 | SIRAL 40 |
|---|---|---|---|---|---|---|---|
| $Al_2O_3 + SiO_2$ | % | 75 | 75 | 75 | 75 | 75 | 75 |
| Loss on Ignition (LOI) | % | 25 | 25 | 25 | 25 | 25 | 25 |
| $Al_2O_3:SiO_2$ | % | 99:1 | 95:5 | 90:10 | 80:20 | 70:30 | 60:40 |
| C | % | 0.2 | 0.2 | 0.2 | 0.2 | 0.2 | 0.2 |
| $Fe_2O_3$ | % | 0.02 | 0.02 | 0.02 | 0.02 | 0.02 | 0.02 |
| $Na_2O$ | % | 0.005 | 0.005 | 0.005 | 0.005 | 0.005 | 0.005 |
| Loose bulk density | [g/l] | 600-800 | 450-650 | 400-600 | 300-500 | 250-450 | 250-450 |
| Particle size ($d_{50}$) | [μm] | 50 | 50 | 50 | 50 | 50 | 50 |
| Surface area (BET)* | [$m^2/g$] | 280 | 370 | 400 | 420 | 470 | 500 |
| Pore volume* | [ml/g] | 0.50 | 0.70 | 0.75 | 0.75 | 0.80 | 0.90 |

*Brunauer, Emmett and Teller (BET) theory and specific surface area determination, after activation at 550° C. for 3 hours.
SIRAL ® is a registered trademark of SASOL.

In one embodiment, the total amount of a metal oxide in the hydrocracking catalyst is from 0.1 wt. % to 90 wt. % based on the bulk dry weight of the finished hydrocracking catalyst. In one embodiment, the hydrocracking catalyst contains from 2 wt. % to 10 wt. % of nickel oxide and from 8 wt. % to 40 wt. % of tungsten oxide based on the bulk dry weight of the finished hydrocracking catalyst.

The hydrocracking catalyst may additionally contain one or more promoters selected from the group consisting of phosphorous (P), boron (B), fluorine (F), silicon (Si), aluminum (Al), zinc (Zn), manganese (Mn), and mixtures thereof. The amount of promoter in the hydrocracking catalyst can be from 0 wt. % to 10 wt. % based on the bulk dry weight of the finished hydrocracking catalyst. In one embodiment, the amount of promoter in the hydrocracking catalyst is from 0.1 wt. % to 5 wt. % based on the bulk dry weight of the finished hydrocracking catalyst.

In one embodiment, the hydrocracking catalyst is in the form of extruded pellets (extrudates) that have an extruded pellet diameter of 10 mm or less, such as from 1.0 to 5.0 mm. In one embodiment, the extruded pellet has a length-to-diameter ratio of 10 to 1. Examples of other types and sizes of pellets used for the hydrocracking catalysts are 1 to 10 mm diameter spheres; 1 to 10 mm diameter cylinders with a length-to-diameter ratio of 4 to 1; 1 to 10 mm asymmetric shapes (including quadrolobes), and up to 10 mm diameter hollow cylinders or rings.

Hydrocracking Catalyst Preparation

The hydrocracking catalyst can be prepared by: a) mixing the zeolite beta, the zeolite USY (when used), the amorphous silica aluminate, the second support material, and enough liquid to form an extrudable paste that forms an extrudate base; b) impregnating the extrudate base with a metal impregnation solution containing at least one metal to make a metal-loaded extrudate; and c) post-treating the metal-loaded extrudate by subjecting the metal-loaded extrudate to drying and calcination.

In one embodiment, the method for making a hydrocracking catalyst, comprises:

a. mixing together a zeolite beta having an OD acidity of 20 to 50 μmol/g; optionally, a zeolite USY; an amorphous silica aluminate; a second support material; and enough liquid to form an extrudable paste;

b. extruding the extrudable paste to form an extrudate base;

c. impregnating the extrudate base with a metal impregnation solution containing at least one metal selected from the group consisting of elements from Group 6 and Group 8 through 10 of the Periodic Table to make a metal-loaded extrudate; and d. post-treating the metal-loaded extrudate by subjecting the metal-loaded extrudate to drying and calcination; wherein the hydrocracking catalyst has improved selectivity for producing a hydrocracked effluent having a TBP of 380-700° F. (193-371° C.).

In one embodiment the liquid used in step a) is a diluted $HNO_3$ acid aqueous solution with from 0.5 to 5 wt % $HNO_3$.

Prior to impregnation, the extrudate base can be dried at a temperature between 90° C. (194° F.) and 150° C. (302° F.) for 30 minutes to 3 hours. The dried extrudate base can then be calcined at one or more temperatures between 350° C. (662° F.) and 700° C. (1292° F.).

In one embodiment, the metal impregnation solution is made by dissolving metal precursors in a solvent. Suitable solvents include water, $C_1$-$C_3$ alcohols, ethers, and amines. In one embodiment, the solvent is deionized water. The concentration of the impregnation solution can be determined by the pore volume of the support and by the selected metal loading. In one embodiment, the extrudate base is exposed to the impregnation solution for 0.1 to 10 hours.

In one embodiment, impregnation of at least one of the metals is achieved in the presence of a modifying agent that can be selected from the group consisting of compounds represented by structures (1) through (4), including condensated forms thereof:

wherein:

(1) R1, R2 and R3 are independently selected from the group consisting of hydrogen; hydroxyl; methyl; amine; and linear or branched, substituted or unsubstituted C1-C3 alkyl groups, C1-C3 alkenyl groups, C1-C3 hydroxyalkyl groups, C1-C3 alkoxyalkyl groups, C1-C3 aminoalkyl groups, C1-C3 oxoalkyl groups, C1-C3 carboxyalkyl groups, C1-C3 aminocarboxyalkyl groups and C1-C3 hydroxycarboxyalkyl groups;

(2) R4 through R10 are independently selected from the group consisting of hydrogen; hydroxyl; and linear or branched, substituted or unsubstituted C2-C3 carboxyalkyl groups; and (3) R11 is selected from the group consisting of linear or branched, saturated and unsaturated, substituted or unsubstituted C1-C3 alkyl groups, C1-C3 hydroxyalkyl groups, and C1-C3 oxoalkyl groups.

Representative examples of modifying agents useful in this embodiment include 2,3-dihydroxy-succinic acid, ethanedioic acid, 2-hydroxyacetic acid, 2-hydroxy-propanoic acid, 2-hydroxy-1,2,3-propanetricarboxylic acid, methoxyacetic acid, cis-1,2-ethylene dicarboxylic acid, hydroethane-1,2-dicarboxyic acid, ethane-1,2-diol, propane-1,2,3-triol, propanedioic acid, and α-hydro-ω-hydroxypoly(oxyethylene).

In an alternate embodiment, deposition of at least one of the metals is achieved in the presence of a modifying agent selected from the group consisting of N,N'-bis(2-amino-ethyl)-1,2-ethane-diamine, 2-amino-3-(1H-indol-3-yl)-propanoic acid, benzaldehyde, [[(carboxymethyl)imino]bis(ethylenenitrilo)]-tetra-acetic acid, 1,2-cyclohexanediamine, 2-hydroxybenzoic acid, thiocyanate, thiosulfate, thiourea, pyridine, and quinoline.

When used, the modifying agent can impede metal aggregation, thereby enhancing the activity and selectivity of the catalyst.

For each embodiment described herein, the amount of modifying agent in the pre-calcined hydrocracking catalyst can be from 0 wt % to 18 wt % based on the bulk dry weight of the hydrocracking catalyst.

In one embodiment, the metal impregnation solution can additionally comprise a peptizing agent. Examples of peptizing agents are organic acids such as pyruvic acid, levulinic acid, acetic acid, 2-ketogulonic acid, keto-gluconic acid, thioglycolic acid, 4-acetylbutyric acid, 1,3-acetonedicarboxylic acid, 3-oxo propanoic acid, 4-oxo butanoic acid, 2,3-diformyl succinic acid, citric acid, 5-oxo pentanoic acid, 4-oxo pentanoic acid, formic acid, propionic acid, butyric acid, valeric acid, caproic acid, enantic acid, caprylic acid, pelargonic acid, capric acid, undecylic acid, lauric acid, tridecylic acid, benzoic acid, salicylic acid, glutaric acid, adipic acid, pimelic acid, azelaic acid, phtalic acid, isophtalic acid, lactic acid, ethyl glyoxylate, glycolic acid, glucose, glycine, oxamic acid, glyoxylic acid, ethylenediaminetetraacetic acid (EDTA), nitrilotriacetic acid, N-methylaminodiacetic acid, iminodiacetic acid, diglycolic acid, malic acid, gluconic acid, acetylacetone, tartaric acid, aconitic acid, suberic acid, tricarballylic acid, malonic acid, succinic acid, and glycolic acid.

In one embodiment the metal-loaded extrudate is dried at one or more temperatures in the range of 38° C. (100° F.) to 149° C. (300° F.) for 0.1 to 10 hours. The dried metal-loaded extrudate can be further calcined at one or more temperatures from 316° C. (600° F.) to 649° C. (1200° F.), with purging excess dry air, for 0.1 to 10 hours.

Hydrocracking Overview

The hydrocracking catalyst has improved selectivity for producing a hydrocracked effluent having a TBP of 380-700° F. (193-371° C.) from a wide variety of hydrocarbonaceous feedstocks. Examples of hydrocarbonaceous feedstocks include those that could be considered disadvantaged feedstocks that would not normally be conducive for making a hydrocracked effluent having a TBP of 380-700° F. (193-371° C.) using a conventional one- or two-stage hydrocracking process. Suitable hydrocarbonaceous feed stocks that can be used can include visbroken gas oils, heavy coker gas oils, gas oils derived from residue hydrocracking or residue desulfurization, other thermally cracked oils, deasphalted oils, Fischer-Tropsch derived feedstocks, cycle oils from a fluid catalytic cracking (FCC) unit, heavy coal-derived distillates, coal gasification byproduct tars, heavy shale-derived oils, organic waste oils such as those from pulp or paper mills or from waste biomass pyrolysis units.

Table 4 lists some typical physical properties for a hydrocarbonaceous feedstock that can be used.

TABLE 4

| Property | |
|---|---|
| API Gravity | 13.5-30.0 |
| N, ppm | 0.5-2,000 |
| S, wt % | 0-5 |
| Polycyclic Index (PCI) | 1500-8000 |
| TBP Range, ° F. (° C.) | 700-1200° F. (371-649° C.) |

Table 5 lists some typical hydrocracking process conditions that can be used.

TABLE 5

| Property | |
|---|---|
| Liquid Hourly Space Velocity (LHSV), hr$^{-1}$ | 0.1-5 |
| H$_2$ partial pressure, psig (kPa) | 800-3,500 (5516-24,132) |

TABLE 5-continued

| Property | |
|---|---|
| H$_2$ Consumption Rate, SCF/B | 200-20,000 |
| H$_2$ Recirculation Rate, SCF/B | 50-5,000 |
| Operating Temperature | 200-450° C. (392-842° F.) |
| Conversion (wt %) | 30-90 |

Depending on the feedstock, target product slate and amount of available hydrogen, the catalyst described herein can be used alone or in combination with other conventional hydrocracking catalysts.

In one embodiment, the catalyst is deployed in one or more fixed beds in a single stage hydrocracking unit, with or without recycle (once-through). Optionally, the single-stage hydrocracking unit may employ multiple single-stage units operated in parallel.

In one embodiment, the catalyst is deployed in one or more beds or units in a two-stage hydrocracking unit, with and without intermediate stage separation, and with or without recycle. Two-stage hydrocracking units can be operated using a full conversion configuration (meaning all of the hydrotreating and hydrocracking is accomplished within the hydrocracking loop via recycle). This embodiment may employ one or more distillation units within the hydrocracking loop for the purpose of stripping off product prior to the second stage hydrocracking step or prior to recycle of the distillation bottoms back to the first and/or second stage.

Two stage hydrocracking units can also be operated in a partial conversion configuration (meaning one or more distillation units are positioned within hydrocracking loop for the purpose of stripping of one or more streams that are passed on for further hydroprocessing). Operation of the hydrocracking unit in this manner allows a refinery to hydroprocess highly disadvantaged feedstocks by allowing undesirable feed components such as the polynuclear aromatics, nitrogen and sulfur species (which can deactivate hydrocracking catalysts) to pass out of the hydrocracking loop for processing by equipment better suited for processing these components, e.g., an FCC unit.

In one embodiment, the catalyst is used in the first stage and optionally the second stage of a partial conversion, two-stage hydrocracking configuration which is well suited for making at least one middle distillate and a heavy vacuum gas fluidized catalytic cracking feedstock (HVGO FCC), by:
(a) hydrocracking a hydrocarbonaceous feedstock to produce a first stage hydrocracked effluent;
(b) distilling the hydrocracked feedstock by atmospheric distillation to form at least one middle distillate fraction and an atmospheric bottoms fraction;
(c) further distilling the atmospheric bottoms fraction by vacuum distillation to form a side-cut vacuum gas oil fraction and a heavy vacuum gas oil FCC feedstock;
(d) hydrocracking the side-cut vacuum gas oil fraction to form a second stage hydrocracked effluent; and
(e) combining the second stage hydrocracked effluent with the first stage hydrocracked effluent.

The refinery configuration illustrated above has several advantages over conventional two-stage hydrocracking schemes. First, in this configuration, the catalyst and operating conditions of the first stage are selected to yield a HVGO FCC stream having only the minimum feed qualities necessary to produce FCC products which meet the established commercial specifications. This is in contrast to a conventional two-stage hydrocracking scheme where the first stage hydrocracking unit is operated at a severity necessary to maximize distillate yield which, in turn, requires the unit to be operated at more severe conditions (which requires more hydrogen and reduces the life of the catalyst).

Second, in this optional configuration, the side-cut vacuum gas oil (VGO) sent to the second stage hydrocracker unit is cleaner and easier to hydrocrack than a conventional second stage hydrocracker feed. Therefore, higher quality middle distillate products can be achieved using a smaller volume of second stage hydrocracking catalyst which, in turn, allows for the construction of a smaller hydrocracker reactor and consumption of less hydrogen. The second stage hydrocracking unit configuration reduces construction cost, lowers catalyst fill cost and operating cost.

Products Made by Hydrocracking

The hydrocracking catalyst can produce significantly increased yields of middle distillates. In another embodiment, the hydrocracking catalyst can also provide reduced yields of products having a cut point below 380° F. In one embodiment, the hydrocracked effluent comprises at greater than 50 vol % to 95 vol % of a heavy middle distillate having a TBP of 380-700° F. (193-371° C.). In one embodiment, the hydrocracked effluent comprises at least 75 vol % to 99 vol % hydrocarbons having a TBP less than 700° F. (371° C.).

In one embodiment, the hydrocracking catalyst produces light naphtha and heavy naphtha, but the yields can be reduced compared to earlier hydrocracking catalysts not comprising the zeolite beta having an OD acidity of 20 to 50 µmol/g and an average domain size from 800 to 1500 nm$^2$.

EXAMPLES

Example 1: Comparative Catalysts

Three commercial catalyst samples were obtained. They were identified as A, B, and C. The composition of these comparative catalysts are summarized in Table 7.

Example 2: Preparation of Catalyst Sample D

Catalyst sample D was prepared by combining 2.3 wt % H-BEA-150 zeolite, 9.0 wt % USY zeolite, 72.6 wt % amorphous silica alumina (ASA) powder, and 16.2 wt % pseudo-boehmite alumina; and mixing them well. The H-BEA-150 zeolite was a zeolite beta that was obtained from SUD CHEMIE. The USY zeolite was obtained from Zeolyst. The USY zeolite had an acid site distribution index (ASDI) of 0.086. Additional properties of the USY zeolite are summarized in Table 6.

TABLE 6

| Brönsted acid sites determined by FTIR after H/D exchange (mmol/g) | |
| --- | --- |
| HF(OD) | 0.076 |
| HF'(OD) | 0.005 |
| LF(OD) | 0.034 |
| LF'(OD) | 0.003 |
| Total | 0.118 |
| ASDI | 0.086 |

The ASA powder was Siral-30 obtained from Sasol. The pseudo-boehmite alumina was CATAPAL C1 from Sasol.

To this mixture described above, a diluted HNO$_3$ acid aqueous solution (3 wt %) was added to form an extrudable paste. The extrudable paste was extruded into a 1/16" (1.59 mm) asymmetric quadrolobe shape, and dried at 248° F. (120° C.) for 1 hour. The dried extrudates were calcined at 1100° F. (593° C.) for 1 hour with purging excess dry air, and cooled down to room temperature.

Ni and W were impregnated onto the dried extruded catalyst using a solution containing ammonium metatungstate and nickel nitrate at concentrations to achieve the target metal loadings of 3.8 wt % NiO and 25.3 wt % WO$_3$, based on the bulk dry weight of the finished catalyst. The metal impregnated extruded catalyst was dried at 270° F. (132° C.) for 1 hour. The dried catalyst was then calcined at 950° F. (510° C.) for 1 hour with purging excess dry air, and cooled down to room temperature. The composition of this finished catalyst sample D is shown in Table 7.

Example 3: Preparation of Catalyst Sample E

Catalyst sample E was prepared similar to the process described in Example 2. 5.6 wt % H-BEA-150 zeolite, 16.2 wt % USY zeolite, 55.6 wt % ASA powder, and 22.6 wt % pseudo-boehmite alumina powder were combined and mixed well. To this mixture, a diluted HNO$_3$ acid aqueous solution (3 wt %) was added to form an extrudable paste. The extrudable paste was extruded into a 1/16" asymmetric quadrolobe shape, and dried at 248° F. (120° C.) for 1 hour. The dried extrudates were calcined at 1100° F. (593° C.) for 1 hour with purging excess dry air, and cooled down to room temperature.

Ni and W were impregnated onto the dried extruded catalyst using a solution containing ammonium metatungstate and nickel nitrate at concentrations to achieve the target metal loadings of 3.8 wt % NiO and 25.3 wt % WO$_3$, based on the bulk dry weight of the finished catalyst. The metal impregnated extruded catalyst was dried at 270° F. (132° C.) for 1 hour. The dried catalyst was then calcined at 950° F. (510° C.) for 1 hour with purging excess dry air, and cooled down to room temperature. The composition of this finished catalyst sample E is shown in Table 7.

Example 4: Preparation of Catalyst Sample F

Catalyst sample F was prepared by the same procedure as used to make catalyst sample E, except H-BEA-35 (SUD CHEMIE) was used instead of H-BEA-150. The composition of this finished catalyst sample F is shown in Table 7.

Example 5: Preparation of Catalyst Sample G

Catalyst sample G was prepared similar to the process described in Example 2. 11.3 wt % H-BEA-150 zeolite, 45.1 wt % USY zeolite, 27.6 wt % ASA powder, and 16.0 wt % pseudo-boehmite alumina powder were combined and mixed well. The pseudo-boehmite alumina was CATAPAL B from Sasol. To this mixture, a diluted HNO$_3$ acid aqueous solution (3 wt %) was added to form an extrudable paste. The extrudable paste was extruded into a 1/16" asymmetric quadrolobe shape, and dried at 248° F. (120° C.) for 1 hour. The dried extrudates were calcined at 1100° F. (593° C.) for 1 hour with purging excess dry air, and cooled down to room temperature.

Ni and W were impregnated onto the dried extruded catalyst using an impregnation solution containing ammonium metatungstate and nickel carbonate at concentrations to achieve the target metal loadings of 5.0 wt % NiO and 29.0 wt % WO$_3$, based on the bulk dry weight of the finished catalyst. The impregnation solution also contained 10.3 grams of citric acid. The metal impregnated extruded catalyst was dried at 212° F. (100° C.) for two hours. The composition of this finished catalyst sample G is shown in Table 7.

TABLE 7

Catalyst Compositions

| Catalyst Component | Base Case A | D | Base Case B | E | F | Base Case C | G |
|---|---|---|---|---|---|---|---|
| Zeolite beta H-BEA-150, wt % | 0 | 1.6 | 0 | 4 | 0 | 0 | 8 |
| Zeolite beta H-BEA-35, wt % | 0 | 0 | 0 | 0 | 4 | 0 | 0 |
| USY Zeolite, wt % | 6 | 6.4 | 20 | 16 | 16 | 40 | 32 |
| Weight Ratio beta/USY | 0 | 0.25 | 0 | 0.25 | 0.25 | 0 | 0.25 |
| NiO, wt % | 3.8 | 3.8 | 3.8 | 3.8 | 3.8 | 3.8 | 5 |
| $WO_3$, wt % | 25.3 | 25.3 | 25.3 | 25.3 | 25.3 | 25.3 | 29 |

Example 6: Comparison of Catalyst Performance

The example catalysts described above were used to process a typical Middle Eastern VGO feedstock. The properties of this feedstock are described in Table 8.

TABLE 8

| API Gravity | 21 |
|---|---|
| N, ppm | 1140 |
| S, wt % | 2.3 |
| Polycyclic Index (PCI) | 2333 |
| TBP Range, ° F. (° C.) | |
| 5 | 708 (376) |
| 10 | 742 (394) |
| 30 | 810 (432) |
| 50 | 861 (461) |
| 70 | 913 (489) |
| 90 | 981 (527) |
| 95 | 1008 (542) |
| Entire Product | 1069 (576) |

The hydrocracking runs were operated in a pilot plant unit under 2300 psig (18,858 kPa) total pressure, 1.0 to 2.0 LHSV, and 5000 SCF/B once through hydrogen gas. The runs were operated in a pilot plant unit under 2300 psig (18,858 kPa) total pressure, 1.0 to 2.0 LHSV, and 5000 SCF/B once through hydrogen gas. The test results are summarized below in Table 9.

TABLE 9

| | Base Case A | D | Base Case B | E | F | Base Case C | G |
|---|---|---|---|---|---|---|---|
| CAT, ° F. (60% conv.) | Base | −9 | Base | −9 | −18 | Base | −6 |
| Yields Compared to Comparative Base Cases, by cut point | | | | | | | |
| $C_4^-$, wt % | Base | −0.4 | Base | −0.9 | 0.2 | Base | −0.5 |
| $C_5$-180° F., vol % | Base | −0.1 | Base | −0.4 | 0.1 | Base | −1.2 |
| 180-380° F., vol % | Base | −1.6 | Base | −1.5 | 0.1 | Base | −4.5 |
| 380-530° F., vol % | Base | 0.8 | Base | 0.2 | −0.3 | Base | 1.0 |
| 530-700° F., vol % | Base | 1.5 | Base | 2.0 | 0.5 | Base | 2.8 |
| Heavy Middle distillates (380-700° F.), vol % | Base | 2.3 | Base | 2.3 | 0.3 | Base | 3.7 |

All of the example catalysts were 6 to 18° F. more active than the commercial comparative catalyst samples. The catalyst samples D, E, and G gave significantly increased yields of heavy middle distillates and reduced yields of products having a cut point below 380° F. It is believed that the hydrocracking catalyst samples comprising H-BEA-150, with the unique distribution of larger domain sizes (and thus fewer faults), reduced the unselective cracking that produces more gas.

Example 7: Comparison and Exemplary Catalyst Preparation and Hydrocracking Performance Comparative catalyst sample H was prepared according to the following procedure: 1.4 wt % beta zeolite (CP811C-300 from Zeolyst, denoted as ZE0106), 5.8 wt % USY (CBV 760 from Zeolyst), 71.3 wt % ASA (from Sasol), and 21.5 wt % pseudo-boehmite alumina powder were mixed well. To this mix, nickel nitrate hexahydrate dissolved in diluted nitric acid were added, so that the total mix contained 0.64 wt % nitric acid, 12.5 wt % nickel nitrate hexahydrate and 43% deionized water. To this mix an ammonium metatungstate solution (54.5 wt % ammonium metatungstentate in water) was added, with enough water to yield an extrudable mix, or paste. The paste was extruded and dried at 130° C. for one hour and calcined at 510° C. for one hour with purging excess dry air. After cooling down to room temperature the catalyst contained 5.2 wt % NiO and 25.2 wt % $WO_3$ on a dry basis.

Catalyst Sample I was prepared by following the procedure of comparative catalyst sample H except that H-BEA-150 ZE0090 was used instead of ZE0106.

The hydrocracking performance of these two catalyst samples, H and I, were tested in a pilot plant unit under the same hydrocracking conditions. The catalyst sample I gave significantly decreased gas yields. Additionally, at the same 55 wt % conversion at 700° F., the hydrocracked effluent using the comparative sample H had a much lower waxy VI (at least 5 lower) than the effluent using the example catalyst I, 128 versus 137, respectively. Waxy VI was measured by ASTM D2270-10 (E 2011).

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible subgeneric combinations of the listed components and mixtures thereof.

The invention illustratively disclosed herein suitably may be practiced in the absence of any element which is not specifically disclosed herein.

It is claimed:

1. A hydrocracking catalyst comprising:
   a. a zeolite beta having an OD acidity of 20 to 50 µmol/g and an average domain size from 800 to 1500 nm$^2$;
   b. a zeolite USY; wherein a wt % of the zeolite beta is less than the wt % of the zeolite USY;
   c. a support comprising an amorphous silica aluminate and a second support material; and
   d. at least one metal selected from the group consisting of elements from Group 6 and Groups 8 through 10 of the Periodic Table.

2. The hydrocracking catalyst of claim 1, wherein the zeolite beta has a SiO$_2$/Al$_2$O$_3$ ratio (SAR) from 50 to 200.

3. The hydrocracking catalyst of claim 1, wherein the OD acidity is from 30 to 40 µmol/g.

4. The hydrocracking catalyst of claim 1, wherein the average domain size is from 900 to 1250 nm$^2$.

5. The hydrocracking catalyst of claim 1, wherein the zeolite beta has more large domains that have a domain size from 1200 to 2000 nm$^2$ than small domains that the domain size from 200 to 600 nm$^2$.

6. The hydrocracking catalyst of claim 1, wherein the zeolite beta has a standard deviation of domain sizes greater than 700 nm$^2$.

7. The hydrocracking catalyst of claim 1, wherein a weight ratio of the zeolite beta to the zeolite USY is from 0.10 to 0.95.

8. The hydrocracking catalyst of claim 1, wherein the zeolite USY has an ASDI between 0.05 and 0.12.

9. The hydrocracking catalyst of claim 1, wherein the second support is a pseudo-boehmite alumina.

10. The hydrocracking catalyst of claim 1, comprising at least one Group 6 metal and at least one metal selected from Groups 8 through 10 of the Periodic Table.

11. A process for hydrocracking a hydrocarbonaceous feedstock, comprising contacting the hydrocarbonaceous feedstock with the hydrocracking catalyst of claim 1 under hydrocracking conditions to produce a hydrocracked effluent that comprises middle distillates.

12. The process of claim 11, wherein the hydrocarbonaceous feedstock has a TBP within 700 to 1200° F. (371 to 649° C.).

13. The process of claim 11, wherein the zeolite beta has a SiO$_2$/Al$_2$O$_3$ ratio (SAR) from 50 to 200.

14. The process of claim 11, wherein the OD acidity is from 30 to 40 µmol/g.

15. The process of claim 11, wherein the average domain size is from 900 to 1250 nm$^2$.

16. The process of claim 11, wherein the zeolite beta has more large domains that have a domain size from 1200 to 2000 nm$^2$ than small domains that the domain size from 200 to 600 nm$^2$.

17. The process of claim 11, wherein the zeolite beta has a standard deviation of domain sizes greater than 700 nm$^2$.

18. The process of claim 11, wherein a weight ratio of the zeolite beta to the zeolite USY is from 0.10 to 0.95.

19. The process of claim 11, wherein the zeolite USY has an ASDI between 0.05 and 0.12.

20. The process of claim 11, wherein the second support is a pseudo-boehmite alumina.

21. The process of claim 11, comprising at least one Group 6 metal and at least one metal selected from Groups 8 through 10 of the Periodic Table.

22. The process of claim 11, wherein the hydrocracked effluent comprises from greater than 50 vol % to 95 vol % of a heavy middle distillate having a TBP of 380-700° F. (193-371° C.).

23. A method for making the hydrocracking catalyst of claim 1, comprising:
   a. mixing together a zeolite beta having an OD acidity of 20 to 50 µmol/g and an average domain size from 800 to 1500 nm$^2$; a zeolite USY in an amount greater than the zeolite beta; an amorphous silica aluminate; a second support material; and enough liquid to form an extrudable paste;
   b. extruding the extrudable paste to form an extrudate base;
   c. impregnating the extrudate base with a metal impregnation solution containing at least one metal selected from the group consisting of elements from Group 6 and Group 8 through 10 of the Periodic Table to make a metal-loaded extrudate; and
   d. post-treating the metal-loaded extrudate by subjecting the metal-loaded extrudate to drying and calcination; wherein the hydrocracking catalyst has improved selectivity for producing a hydrocracked effluent having a TBP of 380-700° F. (193-371° C.).

* * * * *